(12) United States Patent
Ha et al.

(10) Patent No.: US 12,499,936 B2
(45) Date of Patent: Dec. 16, 2025

(54) DUAL-SIX-TRANSISTOR (D6T) IN-MEMORY COMPUTING (IMC) ACCELERATOR SUPPORTING ALWAYS-LINEAR DISCHARGE AND REDUCING DIGITAL STEPS

(71) Applicant: SHANGHAITECH UNIVERSITY, Shanghai (CN)

(72) Inventors: Yajun Ha, Shanghai (CN); Hongtu Zhang, Shanghai (CN); Yuhao Shu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 103 days.

(21) Appl. No.: 18/377,840

(22) Filed: Oct. 9, 2023

(65) Prior Publication Data

US 2024/0135989 A1 Apr. 25, 2024
US 2024/0233815 A9 Jul. 11, 2024

Related U.S. Application Data

(63) Continuation of application No. PCT/CN2022/134240, filed on Nov. 25, 2022.

(30) Foreign Application Priority Data

Oct. 20, 2022 (CN) .......................... 202211285251.X

(51) Int. Cl.
*G06F 17/15* (2006.01)
*G06F 7/544* (2006.01)
(Continued)

(52) U.S. Cl.
CPC ............ *G11C 11/419* (2013.01); *G06F 7/544* (2013.01); *G06F 17/15* (2013.01); *G11C 7/1006* (2013.01);
(Continued)

(58) Field of Classification Search
CPC ......... G11C 11/419; G11C 8/16; G11C 11/54; G11C 7/1006; G06F 7/544; G06F 17/15; G06N 3/063; Y02D 10/00
See application file for complete search history.

(56) References Cited

U.S. PATENT DOCUMENTS 8,724,396 B2 * 5/2014 Takeda ................. G11C 11/412
365/185.23
11,631,456 B2 * 4/2023 Fujiwara ................. G11C 8/16
365/154
(Continued)

FOREIGN PATENT DOCUMENTS

CN     111816231 A    10/2020
CN     113035251 A    6/2021
CN     113935479 A    1/2022

OTHER PUBLICATIONS

Win-San Khwa, et al., A 40-nm, 2M-Cell, 8b-Precision, Hybrid SLC-MLC PCM Computing-in-Memory Macro with 20.5-65.0TOPS/W for Tiny-AI Edge Devices, 2022 IEEE International Solid-State Circuits Conference, Digest Of Technical Papers, 2022, pp. 180-181, 11.3.
(Continued)

*Primary Examiner* — Amir Zarabian
*Assistant Examiner* — Justin Bryce Heisterkamp
(74) *Attorney, Agent, or Firm* — Bayramoglu Law Offices

(57) ABSTRACT

A dual-six-transistor (D6T) in-memory computing (IMC) accelerator supporting always-linear discharge and reducing digital steps is provided. In the IMC accelerator, three effective techniques are proposed: (1) A D6T bitcell can reliably run at 0.4 V and enter a standby mode at 0.26 V, to support parallel processing of dual decoupled ports. (2) An always-linear discharge and convolution mechanism (AL-DCM) not only reduces a voltage of a bit line (BL), but also keeps linear calculation throughout an entire voltage range
(Continued)

of the BL. (3) A bypass of a bias voltage time converter (BVTC) reduces digital steps, but still keeps high energy efficiency and computing density at a low voltage. A measurement result of the IMC accelerator shows that the IMC accelerator achieves an average energy efficiency of 8918 TOPS/W (8b×8b), and an average computing density of 38.6 TOPS/mm$^2$ (8b×8b) in a 55 nm CMOS technology.

10 Claims, 12 Drawing Sheets

(51) Int. Cl.
   G11C 7/10      (2006.01)
   G11C 8/16      (2006.01)
   G11C 11/419    (2006.01)
   G11C 11/54     (2006.01)
   G06N 3/063     (2023.01)

(52) U.S. Cl.
   CPC ............... *G11C 8/16* (2013.01); *G11C 11/54* (2013.01); *G06N 3/063* (2013.01); *Y02D 10/00* (2018.01)

(56) References Cited

U.S. PATENT DOCUMENTS

| | | | | |
|---|---|---|---|---|
| 11,948,659 | B2* | 4/2024 | Yang | G11C 11/54 |
| 2019/0370640 | A1 | 12/2019 | Peng et al. | |
| 2021/0266000 | A1 | 8/2021 | Ge | |
| 2022/0012580 | A1* | 1/2022 | Srivastava | G11C 11/412 |
| 2023/0196079 | A1* | 6/2023 | Zhang | G06N 3/065 |
| | | | | 706/27 |
| 2023/0197154 | A1* | 6/2023 | Chen | G11C 15/04 |
| | | | | 365/49.11 |
| 2023/0386566 | A1* | 11/2023 | Dhori | G06E 3/008 |

OTHER PUBLICATIONS

Muya Chang, et al., A 40nm 60.64TOPS/W ECC-Capable Compute-in-Memory/Digital 2.25MB/768KB RRAM/SRAM System with Embedded Cortex M3 Microprocessor for Edge Recommendation Systems, 2022 IEEE International Solid-State Circuits Conference, Digest Of Technical Papers, 2022, pp. 270-271, 16.3.
Dewei Wang, et al., DIMC: 2219TOPS/W 2569F2/b Digital In-Memory Computing Macro in 28nm Based on Approximate Arithmetic Hardware, 2022 IEEE International Solid-State Circuits Conference, Digest Of Technical Papers, 2022, pp. 266-267, 16.1.
Samuel D. Spetalnick, et al., A 40nm 64kb 26.56TOPS/W 2.37Mb/mm2RRAM Binary/Compute-in-Memory Macro with 4.23x Improvement in Density and >75% Use of Sensing Dynamic Range, 2022 IEEE International Solid-State Circuits Conference, Digest Of Technical Papers, 2022, pp. 268-269, 16.2.
Yuan-Chun Luo, et al., A Technology Path for Scaling Embedded FeRAM to 28 nm and Beyond With 2T1C Structure, IEEE Transactions on Electron Devices, 2022, pp. 109-114, vol. 69 No. 1.
T. Francois, et al., High-Performance Operation and Solder Reflow Compatibility in BEOL-Integrated 16-kb HfO2: Si-Based 1T-1C FeRAM Arrays, IEEE Transactions on Electron Devices, 2022, pp. 2108-2114, vol. 69 No. 4.
Zhenfeng Shao, et al., Real-Time and Accurate UAV Pedestrian Detection for Social Distancing Monitoring in COVID-19 Pandemic, IEEE Transactions on Multimedia, 2022, pp. 2069-2083, vol. 24.
Chaoyou Fu, et al., DVG-Face: Dual Variational Generation for Heterogeneous Face Recognition, IEEE Transactions on Pattern Analysis and Machine Intelligence, 2022, pp. 2938-2952, vol. 44 No. 6.
Yuhang Chen, et al., A Multi-Task Framework for Infrared Small Target Detection and Segmentation, IEEE Transactions on Geoscience and Remote Sensing, 2022, vol. 60, 5003109.
Bo Yan, et al., A Target Detection and Tracking Method for Multiple Radar Systems, IEEE Transactions on Geoscience and Remote Sensing, 2022, vol. 60, 5114721.
Yu-Der Chih, et al., An 89TOPS/W and 16.3TOPS/mm2 All-Digital SRAM-Based Full-Precision Compute-In Memory Macro in 22nm for Machine-Learning Edge Applications, 2021 IEEE International Solid-State Circuits Conference, Digest Of Technical Papers, 2021, pp. 252-253, 16.4.
Bonan Yan, et al., A 1.041-Mb/mm2 27.38-TOPS/W Signed-INT8 Dynamic-Logic-Based ADC-less SRAM Compute-In-Memory Macro in 28nm with Reconfigurable Bitwise Operation for AI and Embedded Applications, 2022 IEEE International Solid-State Circuits Conference, Digest Of Technical Papers, 2022, pp. 188-189, 11.7.
Qing Dong, et al., A 351TOPS/W and 372.4GOPS Compute-in-Memory SRAM Macro in 7nm FinFET CMOS for Machine-Learning Applications, 2020 IEEE International Solid-State Circuits Conference, Digest of Technical Papers, 2020, pp. 242-243, 15.3.
Hidehiro Fujiwara, et al., A 5-nm 254-TOPS/W 221-TOPS/mm2 Fully-Digital Computing-in-Memory Macro Supporting Wide-Range Dynamic-Voltage-Frequency Scaling and Simultaneous MAC and Write Operations, 2022 IEEE International Solid-State Circuits Conference, Digest of Technical Papers, 2022, pp. 186-187, 11.6.
Shanshan Xie, et al., eDRAM-CIM: Compute-In-Memory Design with Reconfigurable Embedded-Dynamic-Memory Array Realizing Adaptive Data Converters and Charge-Domain Computing, 2021 IEEE International Solid-State Circuits Conference, Digest of Technical Papers, 2021, pp. 248-249, 16.2.
Zhengyu Chen, et al., A 65nm 3T Dynamic Analog RAM-Based Computing-in-Memory Macro and CNN Accelerator with Retention Enhancement, Adaptive Analog Sparsity and 44TOPS/W System Energy Efficiency, 2021 IEEE International Solid-State Circuits Conference, Digest of Technical Papers, 2021, pp. 240-241, 15.3.
Niloofar Momeni, et al., CAFS: Cost-Aware Features Selection Method for Multimodal Stress Monitoring on Wearable Devices, IEEE Transactions on Biomedical Engineering, 2022, pp. 1072-1084, vol. 69 No. 3.
Renato Zanetti, et al., Real-Time EEG-Based Cognitive Workload Monitoring on Wearable Devices, IEEE Transactions on Biomedical Engineering, 2022, pp. 265-277, vol. 69 No. 1.
Ankit Raj, et al., Synergizing Smart Home with Smart Parking using IOT, Proceedings of the Second International Conference on Artificial Intelligence and Smart Energy (ICAIS-2022), 2022, pp. 1283-1286.
Md. Rokonuzzaman, et al., IoT-based Distribution and Control System for Smart Home Applications, 2022 IEEE 12th Symposium on Computer Applications & Industrial Electronics (ISCAIE), 2022, pp. 95-98.
Prasenjit Ghorai, et al., State Estimation and Motion Prediction of Vehicles and Vulnerable Road Users for Cooperative Autonomous Driving: A Survey, IEEE Transactions on Intelligent Transportation Systems, 2022, pp. 16983-17002, vol. 23 No. 10.
Dingfu Zhou, et al., Context-Aware 3D Object Detection From a Single Image in Autonomous Driving, IEEE Transactions on Intelligent Transportation Systems, 2022, pp. 18568-18580, vol. 23 No. 10.
Shreshth Tuli, et al., Dynamic Scheduling for Stochastic Edge-Cloud Computing Environments Using A3C Learning and Residual Recurrent Neural Networks, IEEE Transactions on Mobile Computing, 2022, pp. 940-954, vol. 21 No. 3.
Muhammed Tawfiqul Islam, et al., Performance and Cost-Efficient Spark Job Scheduling Based on Deep Reinforcement Learning in Cloud Computing Environments, IEEE Transactions on Parallel and Distributed Systems, 2022, pp. 1695-1710, vol. 33 No. 7.

* cited by examiner

|  | ISSCC'21 [12] | ISSCC'21 [16] | ISSCC'22 [13] | ISSCC'20 [14] | ISSCC'22 [15] | This Work |
|---|---|---|---|---|---|---|
| Technology | 22nm | 65nm | 28nm | 7nm | 5nm | 55nm |
| MAC operation | Digital CIM | Analog CIM | Digital CIM | Analog CIM | Digital CIM | Analog CIM |
| Array size | 64 Kb | 16 Kb | 32 Kb | 4 Kb | 64 Kb | 64 Kb |
| Bitcell type | 1RW 6T | 1RW 1T1C | 1RW 6T | 1R1W 8T | 1R1W 12T | 2R1W 6T |
| Bitcell area | 0.379 um$^2$ | - | - | 0.053 um$^2$ | 0.075 um$^2$ | 1.56 um$^2$ |
| Macro area | 0.202 mm$^2$ | - | 0.030 mm$^2$ | 0.0032 mm$^2$ | 0.0133 mm$^2$ | 0.145 mm$^2$ |
| Voltage | 0.72 V | 1~1.2 V | 0.8 V | 0.8 V | 0.5~0.9 V | 0~0.4/0.8 V |
| Input bit | 1~8 | 8 | 1~8 | 4 | 4 | 2~8 |
| Weight bit | 4 | 8 | 1/4/8 | 4 | 4 | 2~8 |
| TOPS/mm$^2$ | 16.3 (4b/4b)<br>4.5 (8b/8b) | 0.008 (8b/8b) | - | 116 (4b/4b) | 221 (4b/4b)<br>55 (8b/8b) | 75.4 (8b/4b)<br>38.6 (8b/8b) |
| TOPS/W | 89 (4b/4b)<br>24.7 (8b/8b) | 4.76 (8b/8b) | 27.38 (8b/8b) | 351 (4b/4b) | 254 (4b/4b)<br>63 (8b/8b) | 16275 (8b/4b)<br>8918 (8b/8b) |

FIG. 21

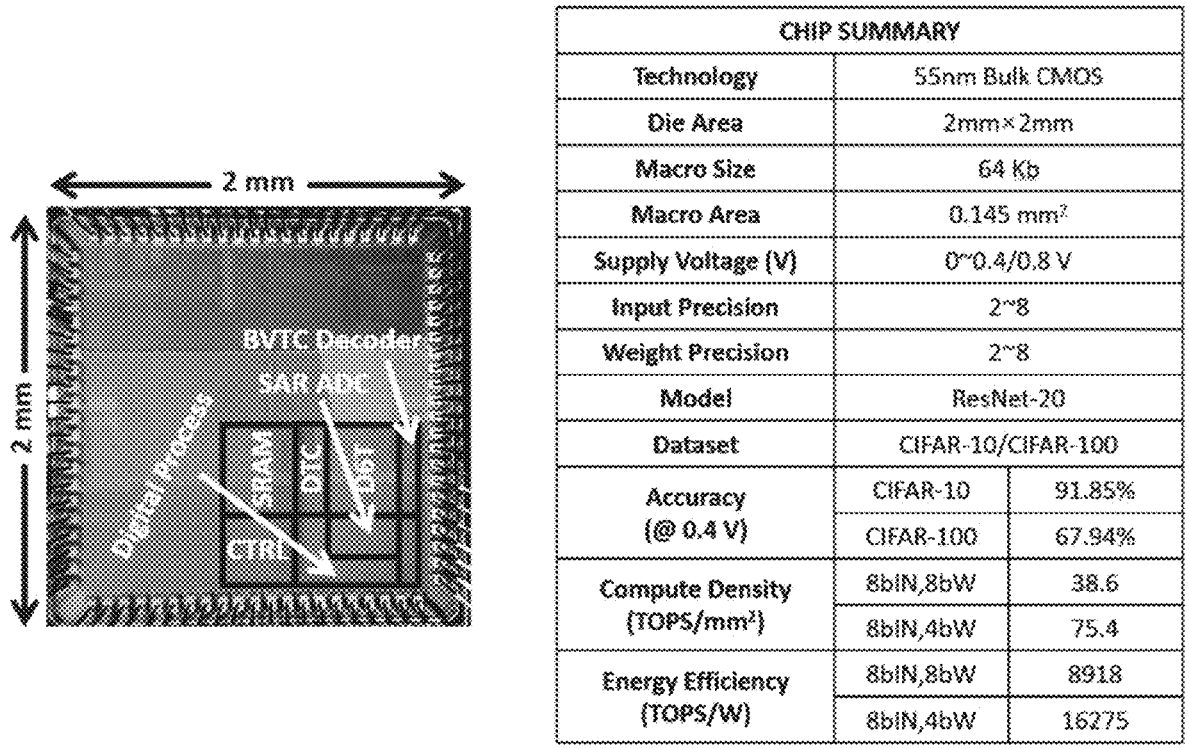

FIG. 22

DUAL-SIX-TRANSISTOR (D6T) IN-MEMORY COMPUTING (IMC) ACCELERATOR SUPPORTING ALWAYS-LINEAR DISCHARGE AND REDUCING DIGITAL STEPS

CROSS REFERENCE TO THE RELATED APPLICATIONS

This application is a continuation application of International Application No. PCT/CN2022/134240, filed on Nov. 25, 2022, which is based upon and claims priority to Chinese Patent Application No. 202211285251.X, filed on Oct. 20, 2022, the entire contents of which are incorporated herein by reference.

TECHNICAL FIELD

The present disclosure relates to a dual-six-transistor (D6T) in-memory computing (IMC) accelerator.

BACKGROUND

IMC embeds a computing unit into the memory[1-3]. Usually, the Von Neumann system running on a computer includes a memory cell and the computing unit. If a transmission speed of the memory cannot keep up with performance of the central processing unit (CPU), computing power is limited, in other words, a "memory wall" emerges. The IMC has a plurality of technological paths based on different storage media, such as a static random access memory (SRAM), a resistive random access memory (RRAM), a ferroelectric random access memory (FeRAM), and other new types of memory[4-7]. In terms of hardware implementation, as a promising computing platform, the IMC is used to realize an artificial intelligence-based neural network with a high throughput constraint. A convolutional neural network (CNN) is rapidly applied to various tasks of the IMC, including pedestrian detection, face recognition, object segmentation, object tracking, and the like, and success is achieved[8-11]. SRAM-based IMC has recently achieved a considerable throughput in both the analog and digital fields[12-15]. In addition, IMC based on an enhanced dynamic random access memory (eDRAM)[16,17] achieves a higher throughput. In the short term, market opportunities for the IMC mainly appear in edge computing, such as wearable and smart home devices[18-21]. In the long term, as the computing power of the IMC increases by 2 to 3 orders of magnitude, IMC is applied to more scenarios, such as autonomous driving and cloud computing[22-25].

Recent research[12-16] demonstrates various types of memory computing, mainly including digital[12,13,15] and analog[14-16] implementations.

FIG. 1 shows a 64 Kb macro-module with a D6T as a basic bitcell. The 64 Kb macro-module includes a digital bypass and an analog bypass. For example, a universal digital bypass structure includes a ReLU sparse circuit, a 5-bit successive-approximation-register analog-to-digital converter (SAR ADC), an on-chip digital processing unit (shifting, addition, Boolean logic, and the like), and a multi-bit digital-to-time converter (DTC) circuit. In addition, a 64 Kb 6T SRAM is used for data transmission and storage of the digital bypass. In contrast, in a design of the analog bypass, only an overhead of a bias voltage time converter (BVTC) is involved. A 64 Kb D6T array serves as a common region for the two bypasses to implement the IMC. The array has 256 write word line (WWL) inputs, which are divided into 16 groups to simultaneously update a plurality of rows of weights. During the IMC, 2×256 time-domain input channels (S1 [n] and S2 [n]) are provided in a row direction. In a column direction, there are 2×256 bit lines (BLs) to accommodate a sufficient quantity of filters.

An existing IMC macro-module[1-5] needs to keep a high computing density while improving energy efficiency, which still poses some challenges: (1) As shown in FIG. 2, a traditional 6T SRAM cell is sensitive to read interference in the case of a low voltage and cannot provide more parallelism for the IMC. (2) As shown in FIG. 3, for each convolution operation, the BL needs to be pre-charged to a high voltage because transistors participating in multiplication and accumulation (MAC) need to generate a linear current under a sufficient $V_{ds}$ voltage, but the current still tends to be nonlinear over time. (3) As shown in FIG. 4, in digitally implemented IMC, overcomplicated steps limit a computing density and energy efficiency, further degrading low-voltage computing performance of the digitally implemented IMC.

CITED REFERENCES

[1] W. S. Khwa et al., "A 40-nm, 2M-Cell, 8b-Precision, Hybrid SLC-MLC PCM Computing-in-Memory Macro with 20.5-65.0TOPS/W for Tiny-AI Edge Devices," 2022 IEEE International Solid-State Circuits Conference (ISSCC), 2022, pp. 1-3, doi: 10.1109/ISSCC42614.2022.9731670.

[2] M. Chang et al., "A 40 nm 60.64TOPS/W ECC-Capable Compute-in-Memory/Digital 2.25 MB/768 KB RRAM/SRAM System with Embedded Cortex M3 Microprocessor for Edge Recommendation Systems," 2022 IEEE International Solid-State Circuits Conference (ISSCC), 2022, pp. 1-3, doi: 10.1109/ISSCC42614.2022.9731679.

[3] D. Wang, C. T. Lin, G. K. Chen, P. Knag, R. K. Krishnamurthy and M. Seok, "DIMC: 2219TOPS/W 2569F2/b Digital In-Memory Computing Macro in 28 nm Based on Approximate Arithmetic Hardware," 2022 IEEE International Solid-State Circuits Conference (ISSCC), 2022, pp. 266-268, doi: 10.1109/ISSCC42614.2022.9731659.

[4] S. D. Spetalnick et al., "A 40 nm 64 kb 26.56TOPS/W 2.37 Mb/mm2RRAM Binary/Compute-in-Memory Macro with 4.23× Improvement in Density and >75% Use of Sensing Dynamic Range," 2022 IEEE International Solid-State Circuits Conference (ISSCC), 2022, pp. 1-3, doi: 10.1109/ISSCC42614.2022.9731725.

[5] M. Chang et al., "A 40 nm 60.64TOPS/W ECC-Capable Compute-in-Memory/Digital 2.25 MB/768 KB RRAM/SRAM System with Embedded Cortex M3 Microprocessor for Edge Recommendation Systems," 2022 IEEE International Solid-State Circuits Conference (ISSCC), 2022, pp. 1-3, doi: 10.1109/ISSCC42614.2022.9731679.

[6] Y. C. Luo, J. Hur, Z. Wang, W. Shim, A. I. Khan and S. Yu, "A Technology Path for Scaling Embedded FeRAM to 28 nm and Beyond With 2T1C Structure," in IEEE Transactions on Electron Devices, vol. 69, no. 1, pp. 109-114, January 2022, doi: 10.1109/TED.2021.3131108.

[7] T. Francois et al., "High-Performance Operation and Solder Reflow Compatibility in BEOL-Integrated 16-kb HfO2: Si-Based 1T-1C FeRAM Arrays," in IEEE Transactions on Electron Devices, vol. 69, no. 4, pp. 2108-2114, April 2022, doi: 10.1109/TED.2021.3138360.

[8] Z. Shao, G. Cheng, J. Ma, Z. Wang, J. Wang and D. Li, "Real-Time and Accurate UAV Pedestrian Detection for Social Distancing Monitoring in COVID-19 Pandemic,"

in IEEE Transactions on Multimedia, vol. 24, pp. 2069-2083, 2022, doi: 10.1109/TMM.2021.3075566.

[9] C. Fu, X. Wu, Y. Hu, H. Huang and R. He, "DVG-Face: Dual Variational Generation for Heterogeneous Face Recognition," in IEEE Transactions on Pattern Analysis and Machine Intelligence, vol. 44, no. 6, pp. 2938-2952, 1 Jun. 2022, doi: 10.1109/TPAMI.2021.3052549.

[10] Y. Chen, L. Li, X. Liu and X. Su, "A Multi-Task Framework for Infrared Small Target Detection and Segmentation," in IEEE Transactions on Geoscience and Remote Sensing, vol. 60, pp. 1-9, 2022, Art no. 5003109, doi: 10.1109/TGRS.2022.3195740.

[11] B. Yan, E. Paolini, L. Xu and H. Lu, "A Target Detection and Tracking Method for Multiple Radar Systems," in IEEE Transactions on Geoscience and Remote Sensing, vol. 60, pp. 1-21, 2022, Art no. 5114721, doi: 10.1109/TGRS.2022.3183387.

[12] Y. D. Chih et al., "An 89TOPS/W and 16.3TOPS/mm2 All-Digital SRAM-Based Full-Precision Compute-In Memory Macro in 22 nm for Machine-Learning Edge Applications," ISSCC, pp. 252-253, 2021.

[13] B. Yan et al., "A 1.041-Mb/mm227.38-TOPS/W Signed-INT8 Dynamic-Logic-Based ADC-less SRAM Compute-in-Memory Macro in 28 nm with Reconfigurable Bitwise Operation for AI and Embedded Applications," 2022 IEEE International Solid-State Circuits Conference (ISSCC), 2022, pp. 188-190, doi: 10.1109/ISSCC42614.2022.9731545.

[14] Q. Dong et al., "A 351TOPS/W and 372.4GOPS Compute-in-Memory SRAM Macro in 7 nm FinFET CMOS for Machine-Learning Applications," ISSCC, pp. 242-243, 2020.

[15] H. Fujiwara et al., "A 5-nm 254-TOPS/W 221-TOPS/mm2 Fully-Digital Computing-in-Memory Macro Supporting Wide-Range Dynamic-Voltage-Frequency Scaling and Simultaneous MAC and Write Operations," 2022 IEEE International Solid-State Circuits Conference (ISSCC), 2022, pp. 1-3, doi: 10.1109/ISSCC42614.2022.9731754.

[16] S. Xie, C. Ni, A. Sayal, P. Jain, F. Hamzaoglu and J. P. Kulkarni, "16.2 eDRAM-CIM: Compute-In-Memory Design with Reconfigurable Embedded-Dynamic-Memory Array Realizing Adaptive Data Converters and Charge-Domain Computing," 2021 IEEE International Solid-State Circuits Conference (ISSCC), 2021, pp. 248-250, doi: 10.1109/ISSCC42613.2021.9365932.

[17] Z. Chen et al., "15.3 A 65 nm 3T Dynamic Analog RAM-Based Computing-in-Memory Macro and CNN Accelerator with Retention Enhancement, Adaptive Analog Sparsity and 44TOPS/W System Energy Efficiency," ISSCC, pp. 240-242, 2021.

[18] N. Momeni, A. A. Valdés, J. Rodrigues, C. Sandi and D. Atienza, "CAFS: Cost-Aware Features Selection Method for Multimodal Stress Monitoring on Wearable Devices," in IEEE Transactions on Biomedical Engineering, vol. 69, no. 3, pp. 1072-1084, March 2022, doi: 10.1109/TBME.2021.3113593.

[19] R. Zanetti, A. Arza, A. Aminifar and D. Atienza, "Real-Time EEG-Based Cognitive Workload Monitoring on Wearable Devices," in IEEE Transactions on Biomedical Engineering, vol. 69, no. 1, pp. 265-277, January 2022, doi: 10.1109/TBME.2021.3092206.

[20] A. Raj, M. Dubey, L. Gugnani and N. Gupta, "Synergizing Smart Home with Smart Parking using IOT," 2022 Second International Conference on Artificial Intelligence and Smart Energy (ICAIS), 2022, pp. 1283-1286, doi: 10.1109/ICAIS53314.2022.9742975.

[21] M. Rokonuzzaman, M. I. Akash, M. Khatun Mishu, W. S. Tan, M. A. Hannan and N. Amin, "IoT based Distribution and Control System for Smart Home Applications," 2022 IEEE 12th Symposium on Computer Applications & Industrial Electronics (ISCAIE), 2022, pp. 95-98, doi: 10.1109/15CAIE54458.2022.9794497.

[22] P. Ghorai, A. Eskandarian, Y. K. Kim and G. Mehr, "State Estimation and Motion Prediction of Vehicles and Vulnerable Road Users for Cooperative Autonomous Driving: A Survey," in IEEE Transactions on Intelligent Transportation Systems, doi: 10.1109/TITS.2022.3160932.

[23] D. Zhou, X. Song, J. Fang, Y Dai, H. Li and L. Zhang, "Context-Aware 3D Object Detection From a Single Image in Autonomous Driving," in IEEE Transactions on Intelligent Transportation Systems, doi: 10.1109/TITS.2022.3154022.

[24] S. Tuli, S. Ilager, K. Ramamohanarao and R. Buyya, "Dynamic Scheduling for Stochastic Edge-Cloud Computing Environments Using A3C Learning and Residual Recurrent Neural Networks," in IEEE Transactions on Mobile Computing, vol. 21, no. 3, pp. 940-954, 1 Mar. 2022, doi: 10.1109/TMC.2020.3017079.

[25] M. T. Islam, S. Karunasekera and R. Buyya, "Performance and Cost-Efficient Spark Job Scheduling Based on Deep Reinforcement Learning in Cloud Computing Environments," in IEEE Transactions on Parallel and Distributed Systems, vol. 33, no. 7, pp. 1695-1710, 1 Jul. 2022, doi: 10.1109/TPDS.2021.3124670.

SUMMARY

Technical problems to be resolved by the present disclosure are challenges faced by an existing IMC macro-module in BACKGROUND.

To resolve the above technical problems, a technical solution of the present disclosure provides a D6T IMC accelerator supporting always-linear discharge and reducing digital steps, where a macro-module of the D6T IMC accelerator includes a digital bypass and an analog bypass, and a D6T array including D6T bitcells serves as a common region for the digital bypass and the analog bypass to implement IMC, where each of the D6T bitcells supports both a conventional memory mode and an IMC mode, and includes: a data writing transistor N1 configured to write logic "0" and "1" to a storage node QB through a write word line (WWL) and a write bit line (WBL); a transistor P1 configured to maintain the logic "1", such that "1" of the storage node QB is directly connected to a VDD; an inverter including one transistor P2 and one transistor N4, configured to provide a gate voltage of the transistor P1 and increase parasitic capacitance of the storage node QB; decoupled reading transistors N2 and N3, serving as dual decoupled ports for external connections and capable of independently performing convolution calculation; strobe signal lines S1 and S2 configured to provide strobe signals to strobe the reading transistors N2 and N1, and a read bit line (RBL) 1 and an RBL 2, configured to read data or obtain a convolution result;

a voltage of the BL is reduced by using an always-linear discharge and convolution mechanism (ALDCM), but linear calculation is kept throughout an entire voltage range of the BL: assuming a longest pulse width of a time-domain input is T, and the macro-module samples a convolution voltage at $T/2+\delta T$, where $\delta T$ represents a ps-level delay, if the convolution voltage is less than (VH−VL)/2, where VH represents a pre-charged voltage of the BL (in other words, a voltage value corresponding to a minimum convolution result), and VL represents a minimum voltage at which the BL performs discharge through a transistor (in other words, a voltage value corresponding to a maximum convolution result), a top plate of a capacitor is boosted to exceed (VH−VL)/2 through a voltage source, such that the discharged RBL 1 and RBL 2 return to a high voltage to keep a sufficient $V_{ds}$ to maintain the reading transistors N2 and N3 performing convolution on the BL as constant-current sources; otherwise, the voltage source is turned off, and the calculation continues;

in the ALDCM, each of the RBL 1 and the RBL 2 is connected to a metal-oxide-metal (MOM) capacitor of a 255C0 capacitor structure to perform multi-bit symbol calculation, where C0 represents a unit capacitor, a flexibly configurable switch is distributed between each group of 255C0s, the switch is capable of performing capacitor recombination between different RBLs 1 and RBLs 2 for charge redistribution to achieve an operation between different bits, convolution results on the RBL 1 and the RBL 2 enter the 255C0 capacitor structure for the charge redistribution, and then an activation result is obtained through an ReLU circuit to serve as a sampling input for a bypass of a bias voltage time converter (BVTC); and a D6T bitcell array in each row has one BVTC for collecting the convolution result and the activation result of the ReLU circuit, the activation result is sampled into a Csamp capacitor of the BVTC to keep or generate a time signal, and the time signal is input into the D6T bitcell array again for convolution.

Preferably, a symmetrical layout is adopted for the D6T bitcell, the two decoupled reading transistors N2 and N3 are placed in upper left and lower left corners respectively, the data writing transistor N1 is placed in an upper right corner, the RBL 1, the RBL 2, and the WBL extend longitudinally, and the strobe signal lines S1 and S2 extend horizontally.

Preferably, the strobe signal lines S1 and S2 do not interfere with each other and are completely independent of each other, one set of control logic is used to read data from the RBL 1, and the other set of control logic is used to read data from the RBL 2.

Preferably, in the IMC mode, multi-bit input data is encoded as time signals with different pulse widths, the time signals are input into the strobe signal lines S1 and S2, and a plurality of transistors on the RBL 1 and the RBL 2 perform discharge simultaneously to finally generate the convolution result.

Preferably, the RBL 1 and the RBL 2 of each column of D6T bitcells in the D6T array are capable of simultaneously calculating two different images or two different parts of a same image.

Preferably, the ALDCM provides N-order linear convolution: the voltage of the BL is detected at time points T/N, 2T/N, 3T/N, . . . , and N−1T/N, and if the voltage of the BL is less than VH−(VH−VL)/N, different voltage sources are used to perform boosting for a plurality of times, where values of these voltage sources may be selected independently to ensure the sufficient $V_{ds}$ for the boosted reading transistors N2 and N3.

Preferably, there are six Csamp capacitors in each BVTC, the six Csamp capacitors sample a voltage of a $C_{CR}$, and the $C_{CR}$ stores the convolution result just calculated.

Preferably, different Csamp capacitors output time signals with different pulse widths, and a larger voltage value stored in the Csamp capacitor leads to a larger pulse width of the generated time signal.

Preferably, a process of obtaining the time signal is as follows: the transistor P1, the transistor P2, and the data writing transistor N1 in the D6T bitcell achieve linear charging of a capacitor Cx, where the transistor P2 acts as the constant-current source, and the transistor P1 and the data writing transistor N1 serve as logic switches; and two input terminals of a high-precision high-speed comparator COMPA are connected to the capacitor Cx and the Csamp capacitor respectively, an output terminal of the high-precision high-speed comparator COMPA is connected to one input terminal of a three-input NAND gate, and the other two input terminals of the three-input NAND gate are respectively configured to input an enabling signal EN and an output that is of an inverter and related to turn-off of the high-precision high-speed comparator COMPA, where the enabling signal EN is synchronized with start charging time of the capacitor Cx, where when the capacitor Cx begins constant-current charging, the enabling signal EN switches from "0" to "1", and in this case, the three-input NAND gate generate a falling edge of a time signal; when the high-precision high-speed comparator COMPA generates a conversion from "1" to "0", a rising edge of the time signal is generated; and the above two edges form a complete time signal with a pulse width, and at this time, the high-precision high-speed comparator COMPA is turned off to reduce a power consumption, while the inverter keeps outputting "0" to make a logical output of the three-input NAND gate always be "1", so as to obtain a time-domain signal with a sharp edge through the output terminal of the three-input NAND gate.

Preferably, four low-power comparators select a rough delay of 1 Td to 4 Td to enable the high-precision high-speed comparator COMPA.

The present disclosure provides a D6T IMC accelerator applied to edge artificial intelligence (AI). The accelerator has characteristics of supporting always-linear discharge and reducing digital steps. In order to address challenges faced by an existing IMC macro-module, in the IMC accelerator provided in the present disclosure, three effective techniques are proposed: (1) A D6T bitcell can reliably run at 0.4 V and enter a standby mode at 0.26 V, to support parallel processing of decoupled dual ports. (2) An ALDCM not only reduces a voltage of a BL, but also keeps linear calculation throughout an entire voltage range of the BL. (3) A bypass of a BVTC reduces digital steps, but still keeps high energy efficiency and computing density at a low voltage. A measurement result of the IMC accelerator shows that the IMC accelerator achieves an average energy efficiency of 8918 TOPS/W (8b×8b), and an average computing density of 38.6 TOPS/mm$^2$ (8b×8b) in a 55 nm CMOS technology.

BRIEF DESCRIPTION OF THE DRAWINGS

FIG. 21 schematically compares the present disclosure and the state-of-the-art work; and FIG. 22 shows an annotated chip photo and a chip summary.

DETAILED DESCRIPTION OF THE EMBODIMENTS

The present disclosure will be further described below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

Figure 1:
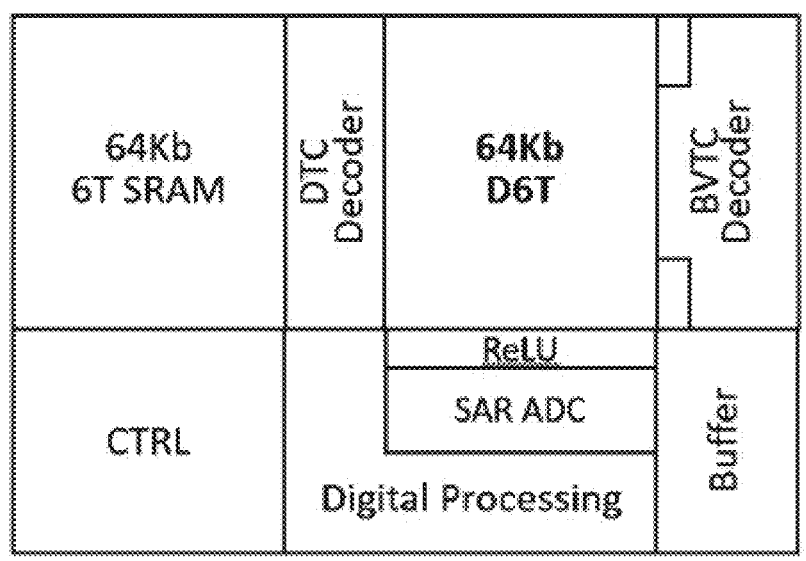
FIG. 1 shows a 64 Kb macro-module with a D6T as a basic bitcell.
Figure 2:
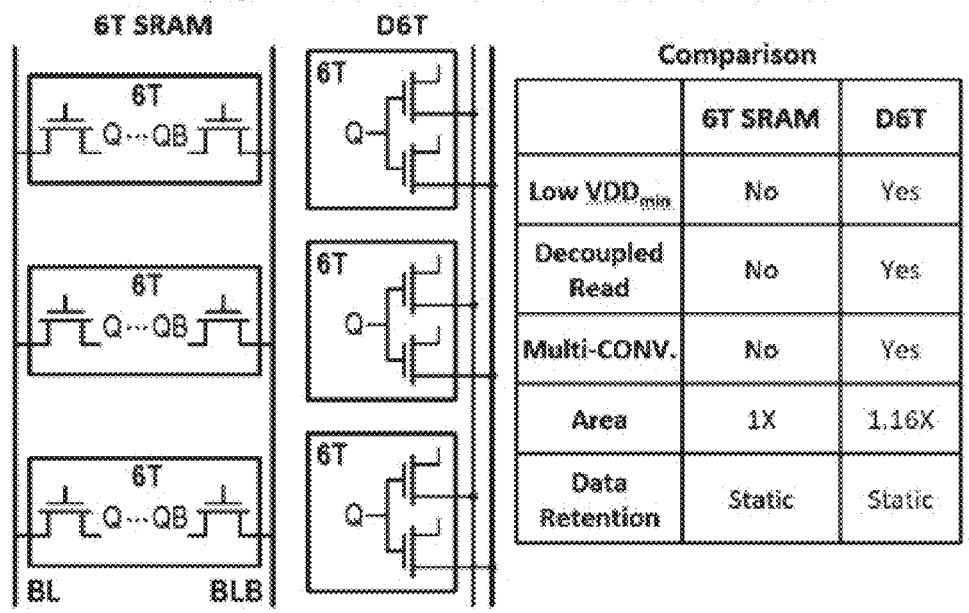
FIG. 2 to FIG. 4 illustrate challenges faced by an existing IMC macro-module.
Figure 3:
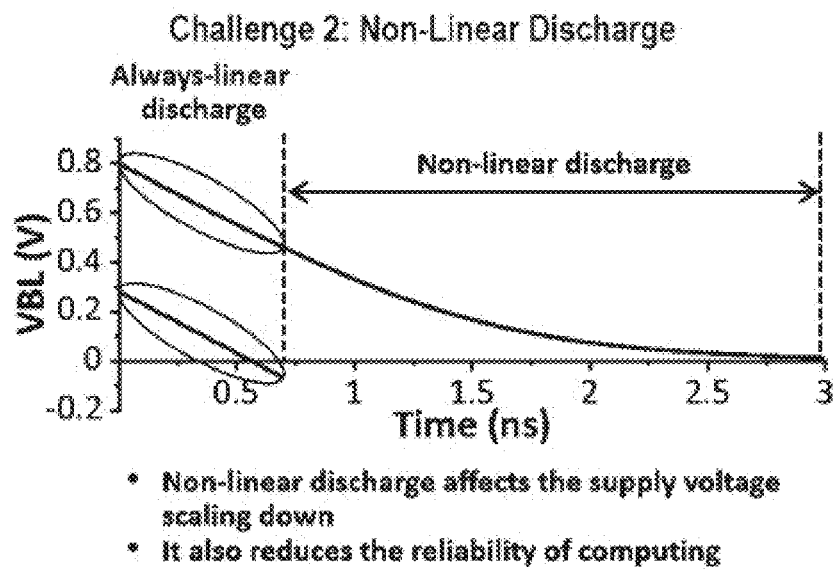
Figure 4:
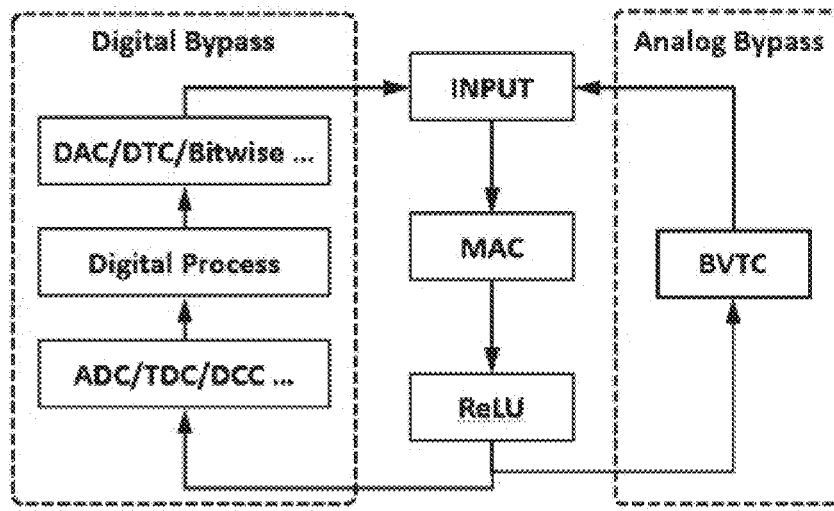
Figure 5:
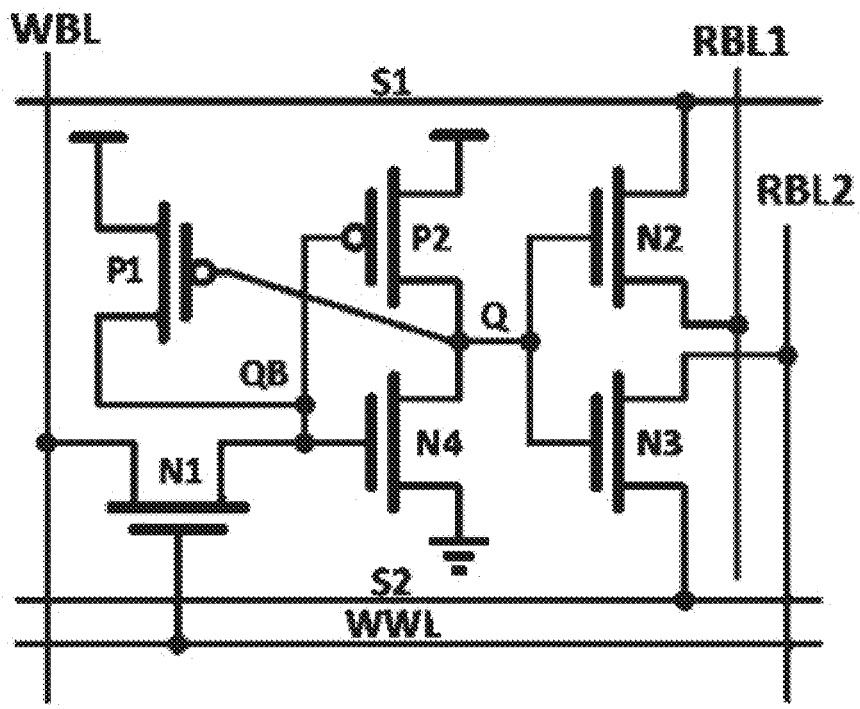
FIG. 5 illustrates a structure of a D6T bitcell.
Figure 6:
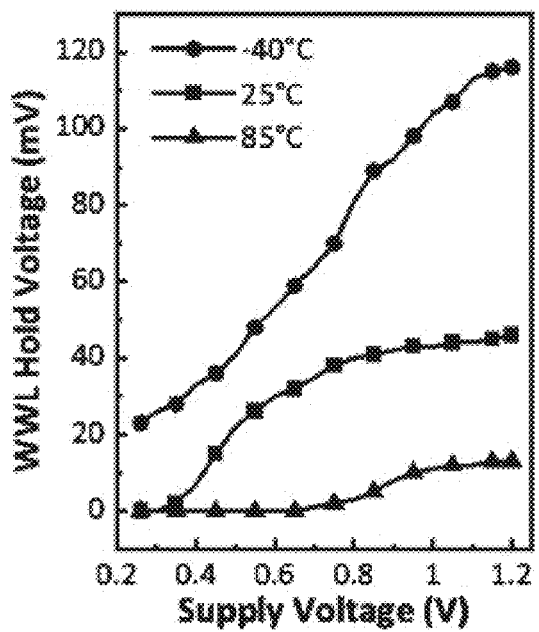
FIG. 6 illustrates that a transistor P1 is turned off and a gate of a data writing transistor N1 needs a voltage of 0 mV to 46 mV at a room temperature of 25° C.

As shown in FIG. 5, a total of six transistors are used in a D6T bitcell of the present disclosure. N1 is a data writing transistor that writes logic "0" and "1" into storage node QB through a WWL and a WBL. P1 is a transistor that maintains the logic "1" (weight value W=0), which can enable "1" of the storage node QB to be directly connected to a VDD, thereby enhancing data stability. When the storage node QB is "0" (weight value W=1), the transistor P1 is turned off, and a gate of the data writing transistor N1 needs a voltage of 0 mV to 46 mV at a room temperature of 25° C. (as shown in FIG. 6) to leak a charge of the logic "0" from the data writing transistor N1 and prevent "0" from being flipped. P2 and N4 form an inverter to provide a gate voltage of the transistor P1 and increase parasitic capacitance of the storage node QB. N2 and N3 are two decoupled reading transistors, or are configured to perform convolution calculation independently. S1, and S2 are configured to provide a strobe signal for strobing the N2 or the N3. If "0" appears in the strobe signal, it indicates that the corresponding reading transistor is selected. If "1" appears in the strobe signal, it indicates that the corresponding reading transistor is turned off. Longitudinal RBL 1 and RBL 2 can read data or obtain a convolution result.

Figure 7:
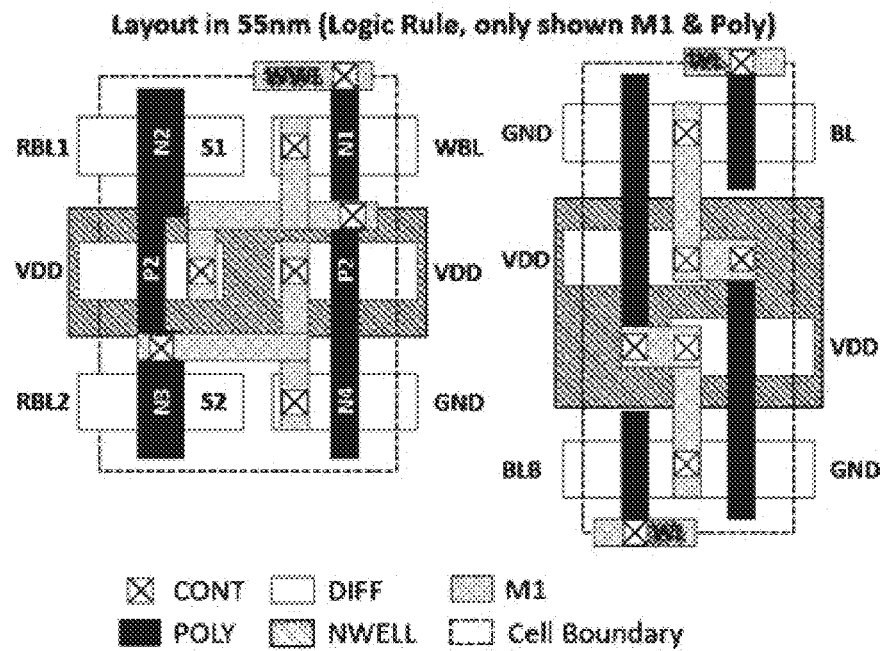
FIG. 7 illustrates a layout of a D6T bitcell.

The D6T bitcell in the present disclosure supports a standby mode at 0.26 V and a reliable convolution operation at 0.4 V, and has dual decoupled ports. Layout area of the D6T bitcell is only 1.16 times that of a 6T SRAM under a minimum logic rule. As shown in FIG. 7, a symmetrical layout is adopted for the D6T bitcell. The two decoupled reading transistors N2 and N3 are placed in upper left and lower left corners respectively, and the data writing transistor N1 is placed in an upper right corner. The RBL 1, the RBL 2, and the WBL extend longitudinally, and the strobe signal lines S1 and S2 extend horizontally. Compared with a 1 read/write (1RW) 6T SRAM, the D6T bitcell provides 2-read 1-write (2R1W) ports to support more complex data transmission and logical calculation. For example, if the D6T bitcell in a row is selected, then the S1 and the S2 in the row are "0". Since both the RBL 1 and the RBL 2 are pre-charged to the VDD before data reading each time, if the storage node QB in the row stores "0", VDD charges of the RBL 1 and the RBL 2 are discharged to "0" through the reading transistors N2 and N3. On the contrary, if the storage node QB stores "1", the VDD charges of the RBL 1 and the RBL 2 are not discharged, so a value of the BL is considered as the logic "1". The strobe signal lines S1 and S2 do not interfere with each other and are completely independent of each other. Therefore, there may be two control systems. One set of control logic is used to read data from the RBL 1, and the other set of control logic is used to read data from the RBL 2, without causing any instruction and timing conflicts. Because a write operation can only be performed from one path of the data writing transistor N1, functions of the 2R1W ports have been implemented.

Figure 8:
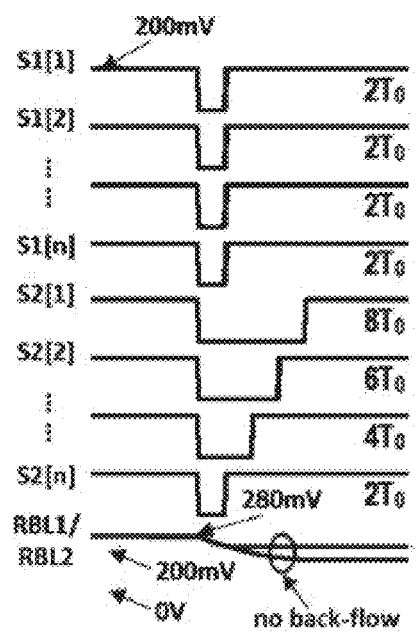
FIG. 8 illustrates an IMC mode of a D6T bitcell.

As shown in FIG. 8, in the IMC mode (corresponding to the logical calculation), multi-bit input data is encoded as time signals with different pulse widths, and the time signals are input into the strobe signal lines S1 and S2. Because the transistor always works in a saturation region (with a sufficient Vas), a longer pulse signal leads to longer constant-current discharge time. A plurality of transistors on the RBL 1 and the RBL 2 perform discharge simultaneously to finally generate the convolution result.

Therefore, the D6T bitcell in the present disclosure supports both a conventional memory mode and the IMC mode.

Figure 9:
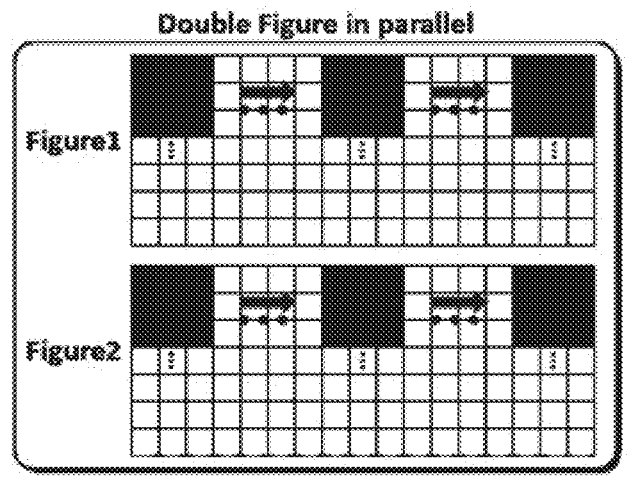
FIG. 9 illustrates that an RBL 1 and an RBL 2 of each column of D6T bitcells in the present disclosure can simultaneously calculate two different images.
Figure 10:
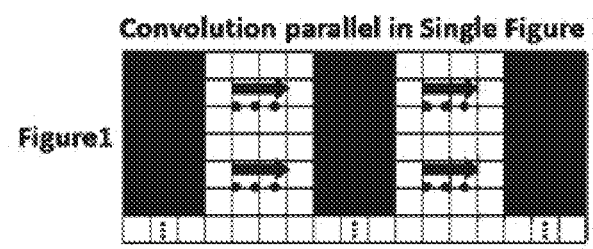
FIG. 10 is a schematic diagram of dividing a computational workload of a same graph into two parts and evenly distributing them to an RBL 1 and an RBL 2.
Figure 11:
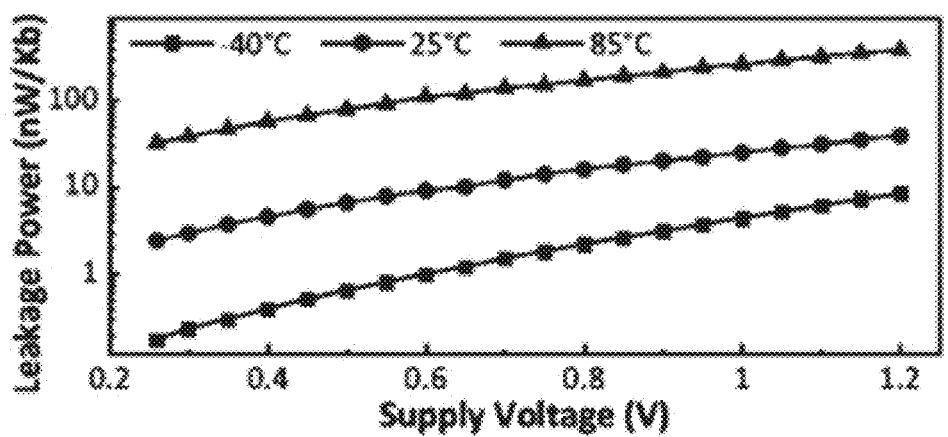
FIG. 11 illustrates a measurement result of an average standby power consumption.
Figure 12:
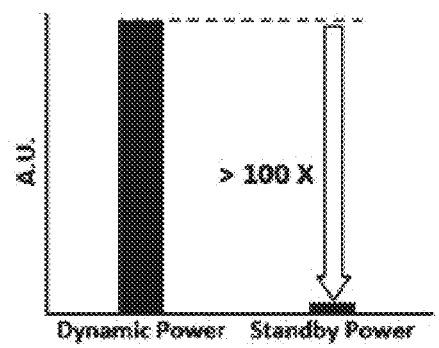
FIG. 12 illustrates that standby (leakage) power can be ignored.

As shown in FIG. 9, the RBL 1 and RBL 2 of each column of D6T bitcells can simultaneously calculate two different images. Alternatively, as shown in FIG. 10, a computational workload of a same graph is divided into two parts and averagely allocated to the RBL 1 and RBL 2 of each column of D6T bitcells. A measurement result of ten chip samples indicates that in the standard memory mode, the longest time in the worst case for reading and writing data in each row at 0.4 V is 1.1 ns and 6.2 ns respectively. In the IMC mode, the dual parallel decoupled ports are used to support simultaneous processing of two images or 2-fold acceleration of single-layer convolution, significantly improving a computing density. To reduce a convolution deviation, turn-off voltages of the transistors N2 and N3 performing MAC are set to 200 mV to suppress current backflow caused by a low voltage of the BL. In addition, the large-sized transistors N2 and N3 also reduce the process variation at near-threshold. For data writing, since a threshold voltage of the selected data writing transistor N1 (RVT) is significantly less than a threshold voltage of the transistor P1 (HVT), data "0" can also be successfully written into the D6T bitcell even without a charge pump. On one hand, the measurement result indicates that a minimum value of the WWL at different voltages is 0 mV to 46 mV at 25° C., and the data "0" can be kept within this voltage range. On the other hand, data "1" can still be kept even in the case of a weak current. As for leakage, the present disclosure uses a thermostat to evaluate average standby power consumptions at −40° C., 25° C., and 85° C., which are respectively 0.17 nW/Kb, 2.4 nW/Kb, and 32.2 nW/Kb at 0.26 V, as shown in FIG. 11. Especially when the accelerator runs in the IMC mode, dynamic power of the IMC is more than 100 times standby (leakage) power, so the standby (leakage) power can be ignored, as shown in FIG. 12.

Figure 13:
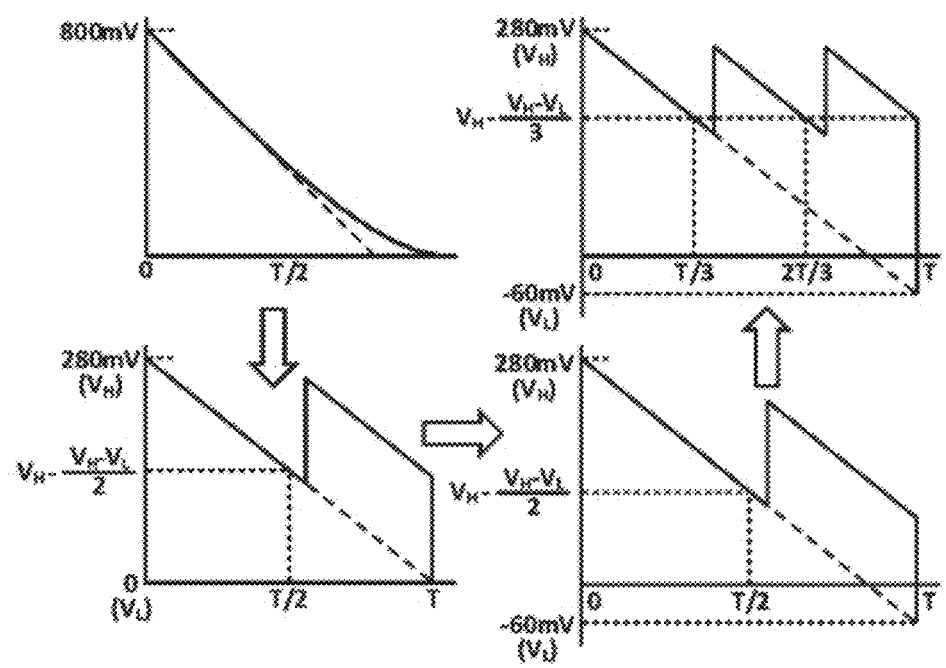
FIG. 13 illustrates a boosting result of N-order linear MAC.
Figure 14:
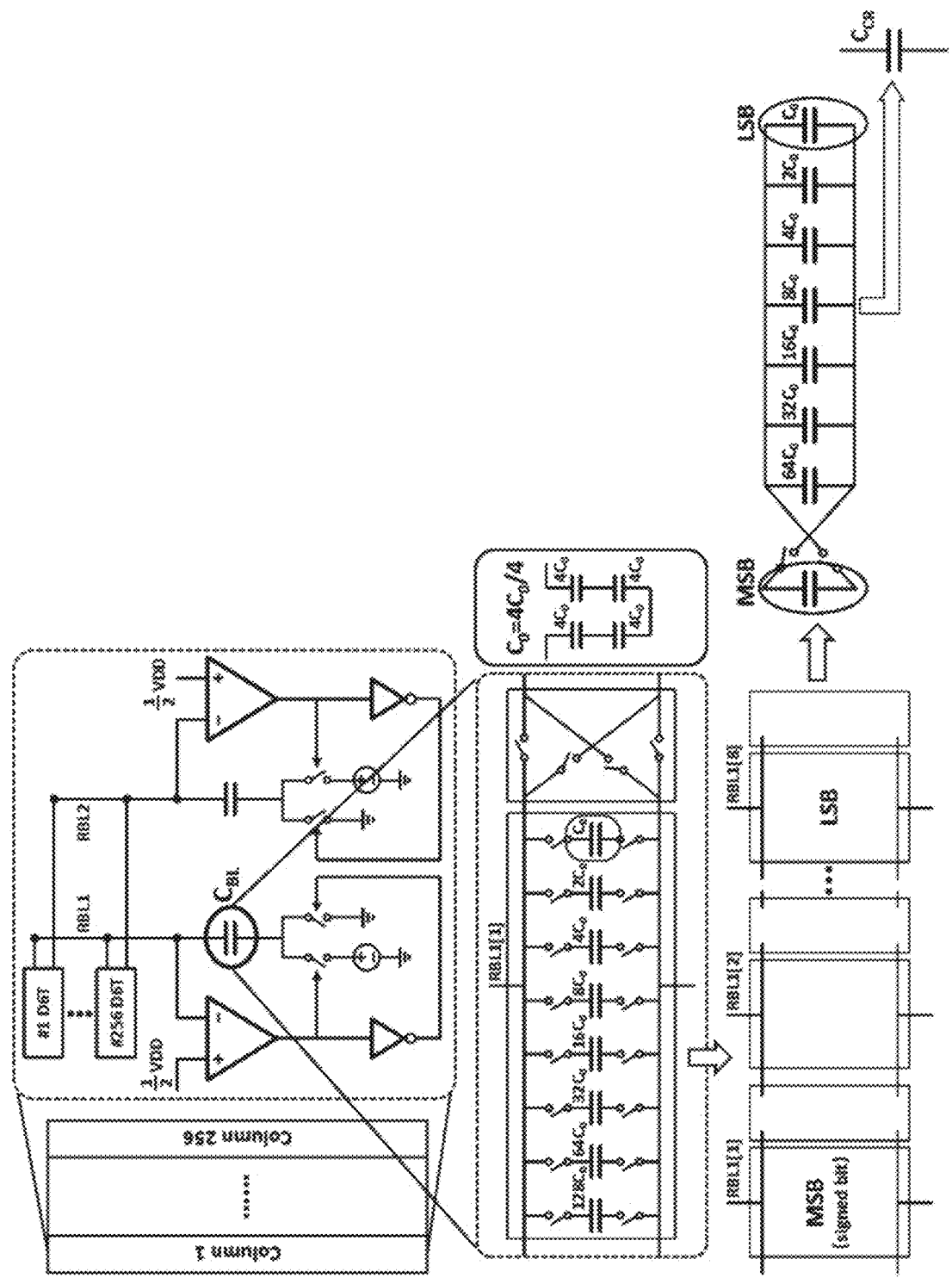
FIG. 14 illustrates a 255C0 structure.
Figure 15:
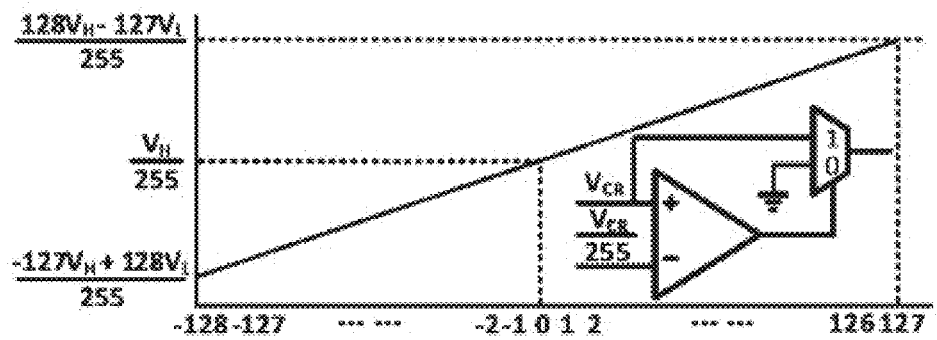
FIG. 15 is a schematic diagram of using a ReLU low-power comparator to output a convolution result.

The present disclosure reduces a voltage of the BL by using an ALDCM, but keeps linear calculation throughout an entire voltage range of the BL. For a standard voltage design, the BL requires a pre-charged voltage (VH) of up to 0.8 V to 1.2 V. This is to prevent the transistor performing the MAC from entering a nonlinear discharge region, resulting in unoptimized BL energy accounting for 67.3% of total energy of the MAC. The present disclosure develops a novel ALDCM technology, which specifically includes following content:

It is assumed that a longest pulse width of a time-domain input is T, and the macro-module samples a convolution voltage at T/2+δT, where δT represents a ps-level delay. If a voltage of a MAC capacitor is less than (VH−VL)/2, a 140 mV voltage source boosts a top plate of the capacitor to exceed (VH−VL)/2. Otherwise, the voltage source is turned off, and the calculation continues. The transistor performing the MAC on the BL is maintained as a constant-current source by keeping the sufficient $V_{ds}$ (the 140 mV voltage source enables the discharged RBL 1 and RBL 2 to return to a high voltage, in other words, the $V_{ds}$ increases again for the transistors N2 and N3). To further improve computational linearity, the ALDCM provides high-order linear MAC, namely, N-order linear MAC. The voltage of the BL is detected at time points T/N, 2T/N, 3T/N, ..., and N−1T/N. If the voltage of the BL is less than VH−VH−VL)/N, different voltage sources are used to perform boosting for a plurality of times. Values of these voltage sources may be selected independently, and it is only required to ensure the sufficient $V_{ds}$ after the boosting (the voltage of the BL after the boosting is greater than VH−(VH−VL)/N again), as shown in FIG. 13. In this way, a change range of the $V_{ds}$ of the transistor performing the MAC is further reduced, such that a slope current with almost a constant slope is generated. In addition, the ALDCM provided in the present disclosure has a flexible and reconfigurable MOM capacitor architecture (hereinafter referred to as a "MOM capacitor") for multi-bit symbol calculation. The MOM capacitor connected to each BL is of a 255C0 architecture, which can be divided into a plurality of types of 2"C0s, where C0 represents a unit capacitor. For this design, the MOM capacitor is manufactured on high-level metal above the D6T array, so there is almost no additional area overhead. During a multi-bit operation, charge redistribution occurs between the RBL1[n] of an $n^{th}$ D6T bitcell, and so does between the RBL2[n] of the $n^{th}$ D6T bitcell. Especially, capacitor plates of a symbol bit and other bits need to be connected in reverse. To reduce capacitor mismatches, four 4C0 capacitors are connected in series to form a lowest bit, and two 4C0 capacitors are connected in series to form a second lowest bit. For a flexible and precise configuration, this capacitor structure can map weights of 2 to 8 bits. A flexibly configurable switch is distributed between each group of 255C0s. The switch is capable of performing capacitor recombination between different RBLs to achieve an operation between different bits. For example, in an 8-bit operation, a highest bit is the symbol bit, corresponding to $2^7$C0, while the remaining seven bits are $2^6$C0, $2^5$C0, $2^4$C0, $2^3$C0, $2^2$C0, 2C0, and C0. After the calculation is completed, the switch is used to directly connect positive terminals of capacitors in the last seven bits mutually and connect negative terminals of the capacitors in the last seven bits mutually to perform charge distribution. A positive terminal of the capacitor in the symbol bit is connected to the negative terminals of the capacitors in the last seven bits, and a negative terminal of the capacitor in the symbol bit is connected to the positive terminals of the capacitors in the last seven bits, to perform the charge redistribution, as shown in FIG. 14. Next, the present disclosure further uses a ReLU low-power comparator to output an activation result. For example, a convolution result of the 8-bit operation ranges from −127VH+128VL/255 to 128VH−127VL/255. When a voltage in the convolution result is less than VH/255, 0 V is output (strictly speaking, VH/255 is output, but VH/255≈0). Otherwise, the convolution voltage is retained and used as a sampling input for the BVTC, as shown in FIG. 15.

The ALDCM provided in the present disclosure not only performs the MAC with almost no area overhead and an ultra-low voltage of the BL, but also provides always-linear discharge. The measurement result proves that a lower voltage limit (VL) of the BL can reach a negative voltage of −60 mV. This means that even if the pre-charged voltage of the BL is aggressively adjusted to 280 mV, an appropriate MAC range of 340 mV can still be obtained.

The bypass of the BVTC provided in the present disclosure significantly reduces digital steps in the IMC to achieve high energy efficiency while keeping a high computing density at the low voltage. The BVTC in the present disclosure directly converts a result of the RBL into an input of subsequent convolution.

Figure 17:
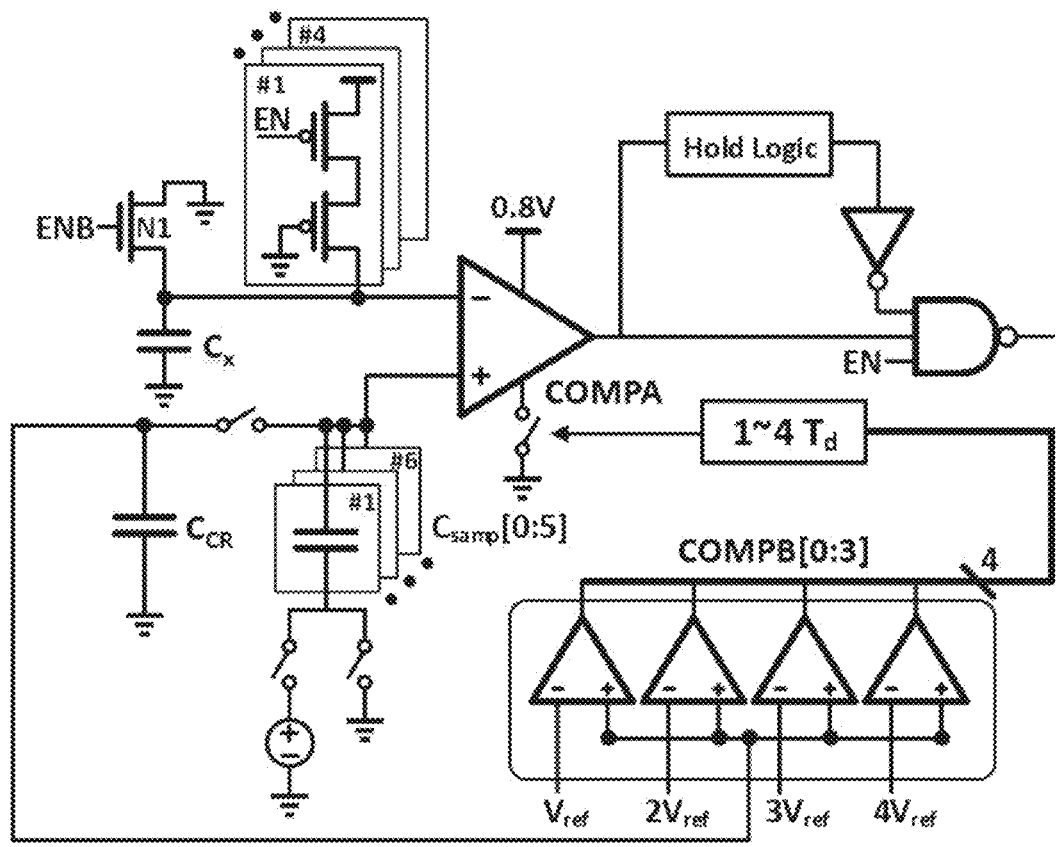
FIG. 17 illustrates a structure of a BVTC according to the present disclosure.

As shown in FIG. 17, a D6T bitcell array in each row has one BVTC, and an input terminal of the BVTC collects a result obtained after convolution and ReLU activation. There are 6 Csamp capacitors in each BVTC, which means that results of up to six recent convolution and ReLU activation operations can be collected. Even if a voltage saved by the Csamp capacitor is not immediately used, a recent convolution result is also stored on these capacitors in a form of an analog voltage for a long time. Therefore, there is no need to convert these analog voltage values into redundant digital codes and store the digital codes in an external SRAM. Specifically, Csamp [0:5] samples a voltage of a $C_{CR}$. The $C_{CR}$ stores a MAC result just calculated, in other words, a calculation result of the 255C0 capacitor architecture. In a sampling process, a VH/2° voltage source of a bottom plate of the Csamp capacitor is turned on. After the sampling, the bottom plate is grounded to eliminate a positive common-mode voltage.

Figure 16:
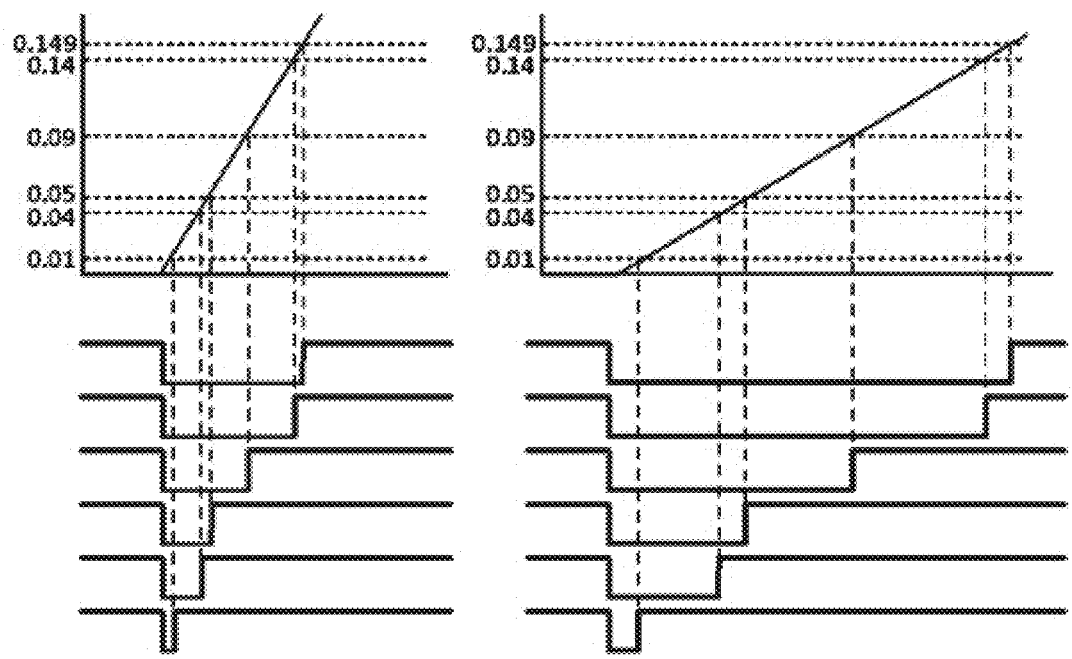
FIG. 16 illustrates that a larger voltage value stored in a Csamp capacitor leads to a larger pulse width of a generated time signal.

Different Csamp capacitors output time signals with different pulse widths, and a larger voltage value stored in the Csamp capacitor leads to a larger pulse width of the generated time signal, as shown in FIG. 16. These time signals serve as an input for next convolution (MAC). A process of obtaining the time signal is as follows: the transistor P1, the transistor P2, and the data writing transistor N1 in the D6T bitcell achieve linear charging of a capacitor Cx, where the transistor P2 acts as the constant-current source, and the transistors P1 and N1 serve as logic switches. The present disclosure designs high-precision high-speed comparator COMPA with a 0.8 V power supply, and a three-input NAND gate. Two input terminals of the high-precision high-speed comparator COMPA are connected to the capacitor Cx and the Csamp[0:5] respectively, an output terminal of the high-precision high-speed comparator COMPA is connected to one input terminal of the three-input NAND gate, and the other two input terminals of the three-input NAND gate are respectively configured to input an enabling signal EN and an output that is of the inverter and related to turn-off of the high-precision high-speed comparator COMPA.

The enabling signal EN is synchronized with start charging time of the capacitor Cx. When the capacitor Cx begins constant-current charging, the enabling signal EN switches from "0" to "1", and in this case, the three-input NAND gate generate a falling edge (start) of a time signal. When the high-precision high-speed comparator COMPA generates a conversion from "1" to "0", a rising edge (end) of the time signal is generated. The above two edges form a complete time signal with a pulse width. At this time, the high-precision high-speed comparator COMPA can be turned off to reduce a power consumption, while the inverter keeps outputting "0" to make a logical output of the three-input NAND gate always be "1", so as to obtain a time-domain signal with a sharp edge through the output terminal of the three-input NAND gate. Five sets of transistors with different sizes and adjustable bias voltages are designed to overcome technical variables.

In order to reduce a power consumption of the BVTC, a following strategy is adopted: To avoid untimely turn-on of the high-precision high-speed comparator COMPA, especially in the case of a large power consumption when Vsamp is high (the Vsamp represents the voltage in the convolution result sampled by the Csamp capacitor, which is sent to the input terminal of the high-precision high-speed comparator COMPA and compared with a voltage of the capacitor Cx to generate a time signal with a variable pulse width), four low-power comparators COMPB [0:3] select a rough delay of 1 Td to 4 Td to turn on the high-precision high-speed comparator COMPA. After the high-precision high-speed comparator COMPA generates a conversion from "1" to "0", the three-input NAND gate generates the rising edge (second edge) of the time signal, which means that the time signal has been generated. A turn-off logic module turns off the high-precision high-speed comparator COMPA, and uses one inverter to output "0" to maintain the output logic "1" of the three-input NAND gate.

Figure 18:
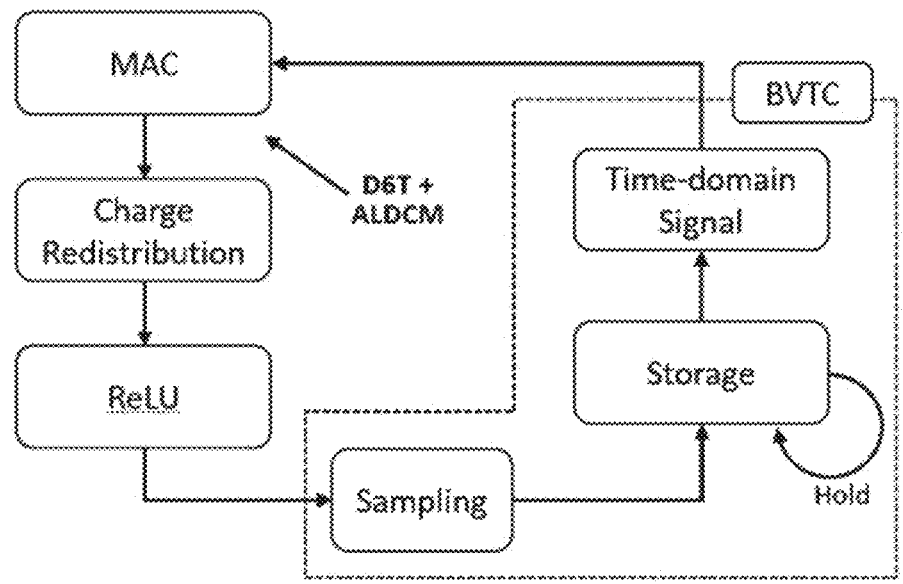
FIG. 18 is a new process provided by a BVTC according to the present disclosure.

In combination with FIG. 18, the BVTC provides a new process:

After the convolution (MAC) ends, the charge redistribution is performed in the 255C0 capacitor structure. Then, the activation result is obtained by using a simple ReLU circuit. The activation result is sampled into the Csamp capacitor of the BVTC to keep or generate a time signal, and the time signal is input into the D6T bitcell array again for convolution (MAC).

Figure 19:
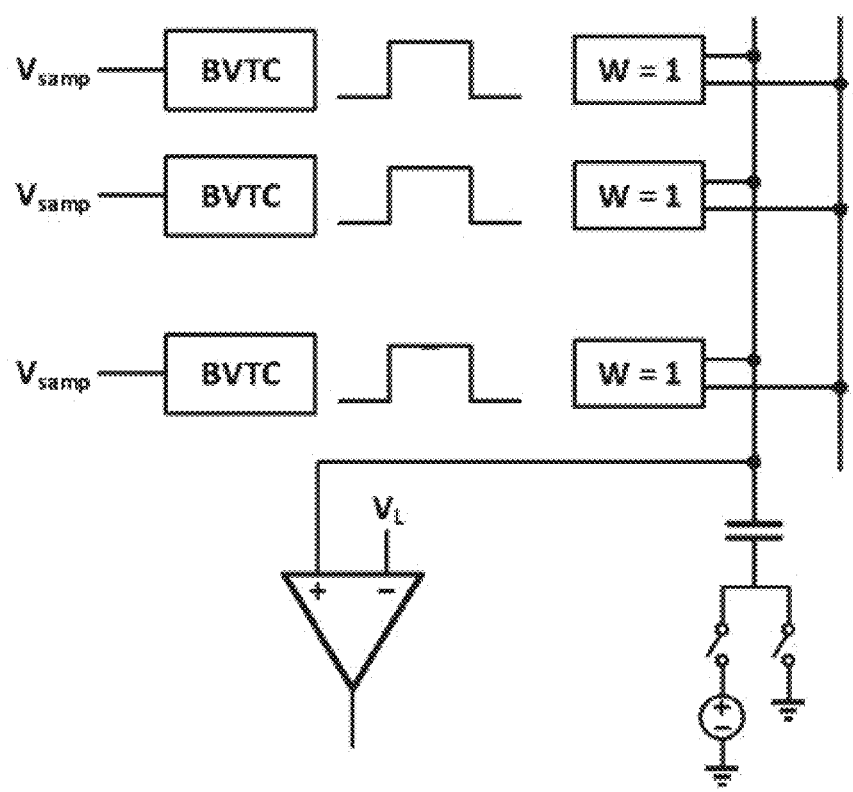
FIG. 19 is a schematic diagram of manually setting a value of a reference voltage $V_L$ of a voltage of a BL.

As shown in FIG. 19, in order to manually set a value of a reference voltage $V_L$ of the BL and further reduce the deviation of the BVTC, any column is taken as an example to check an output: The Csamp capacitor of the BVTC in each row samples and saves a voltage of (128 VH−127VL)/255, and converts the voltage into a time signal. Voltages of storage nodes QB of all memory cells in the tested column are 0 V (weight value W=1). Whether the lower voltage limit of the BL is the reference voltage $V_L$ is determined by comparing the voltage of the BL and the reference voltage $V_L$. If the comparator flips, it indicates that the lower voltage limit at this time is indeed the reference voltage $V_L$.

Figure 20:
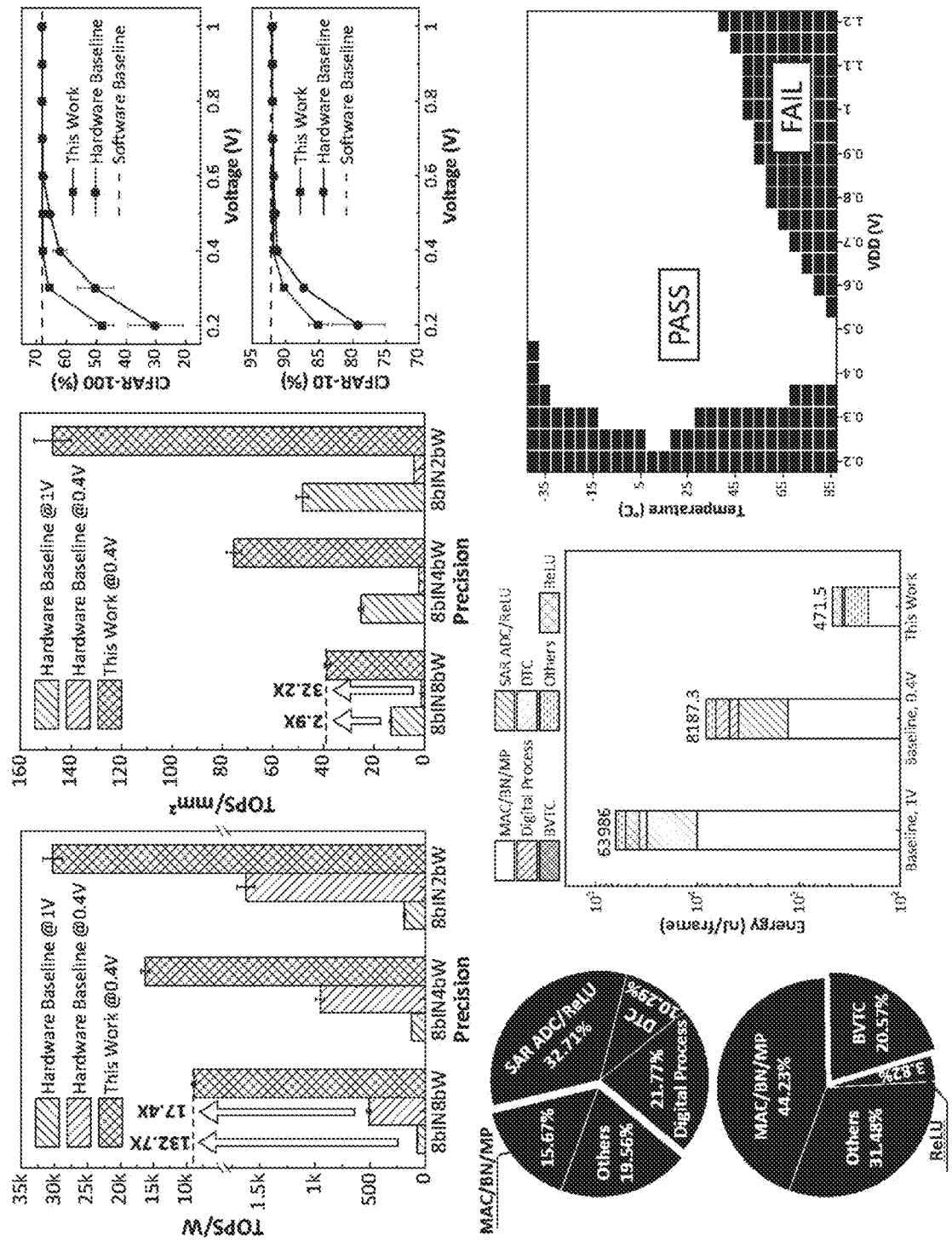
FIG. 20 illustrates a measurement result of a 55 nm 64 Kb D6T chip according to the present disclosure.

In combination with FIG. 20, digital bypasses and analog bypasses in ten chips are measured, and the digital bypasses is used as a hardware reference group for comparison. When the D6T bitcell is powered at 0.4 V, the working analog bypass achieves an energy efficiency of 8918 TOPS/W (8b×8b), which is 17.4 times and 132.7 times that of the digital bypass working at 0.4 V and 1 V respectively. In addition, this method also keeps a computing density of up to 38.6 TOPS/mm$^2$ (8b×8b) in a 55 nm CMOS technology, which is 32.2 times and 2.9 times that of the digital bypasses working at 0.4 V and 1 V respectively. For a ResNet-20 model, the digital bypass is more prone to loss of accuracy at a voltage lower than 0.5 V. It is found through analysis that this may be caused by error accumulation due to too many steps. However, the analog bypass can still achieve 91.85% accuracy of CIFAR-10 and 67.94% accuracy of CIFAR-100 at 0.4 V. For energy composition, the digital bypass has a digital correlation of up to 64.77%, while the analog bypass has the BVTC having 20.57% of total energies. Especially, the analog bypass of the ResNet-20 only consumes 471.5 nJ/frame. A temperature characteristic is also measured. An excessive temperature (>70° C.) can cause a sharp increase in on-chip capacitor leakage, leading to a failure of a new product. A too low temperature (≤20° C.) can cause a storage node of the data '0' to be unable to keep correctness.

In combination with FIG. 21, the present disclosure implements a 64 Kb D6T acceleration chip in the 55 nm CMOS technology, which improves the energy efficiency while keeping the high computing density. Both the digital bypass and the analog bypass are implemented and compared in the ten chips. This D6T array achieves an energy efficiency of 8918 TOPS/W (8b×8b), which is 141 times higher than that achieved in the most advanced research[5]. Compared with a more advanced CMOS technology (<10 nm), this 55 nm work can still reach a computing density of 38.6 TOPS/mm$^2$ (8b×8b).

What is claimed is:

1. A dual-six-transistor (D6T) in-memory computing (IMC) accelerator supporting always-linear discharge and reducing digital steps, wherein a macro-module of the D6T IMC accelerator comprises a digital bypass and an analog bypass, and a D6T array comprising D6T bitcells serves as a common region for the digital bypass and the analog bypass to implement IMC, wherein each of the D6T bitcells supports both a conventional memory mode and an IMC mode, and comprises: a data writing transistor (N1) configured to write logic "0" and "1" to a storage node QB through a write word line (WWL) and a write bit line (WBL); a first transistor (P1) configured to maintain the logic "1", wherein "1" of the storage node QB is directly connected to a VDD; an inverter comprising a second transistor (P2) and a third transistor (N4) and configured to provide a gate voltage of the first transistor (P1) and increase a parasitic capacitance of the storage node QB; a first reading transistor (N2) and a second reading transistor (N3), serving as dual decoupled ports for external connections and allowed for independently performing a convolution calculation; strobe signal lines S1 and S2 configured to provide strobe signals to strobe the first reading transistor (N2) and the second reading transistor (N3); and a first read bit line (RBL 1) and a second read bit line (RBL 2), configured to read data or obtain a convolution result;

a voltage of a BL is reduced by using an always-linear discharge and convolution mechanism (ALDCM), but a linear calculation is kept throughout an entire voltage range of the BL: assuming a longest pulse width of a time-domain input is T, and the macro-module samples a convolution voltage at T/2+δT, wherein δT represents a ps-level delay, if the convolution voltage is less than (VH−VL)/2, wherein VH represents a pre-charged voltage of the BL, and VL represents a minimum voltage where the BL performs discharge through a transistor, a top plate of a capacitor is boosted to exceed (VH−VL)/2 through a voltage source, wherein the first read bit line (RBL 1) and the second read bit line (RBL 2) return to a high voltage to keep a sufficient $V_{ds}$ to maintain the first reading transistor (N2) and the second reading transistor (N3) performing convolution on the BL as constant-current sources; otherwise, the voltage source is turned off, and the linear calculation continues;

in the ALDCM, each of the first read bit line (RBL 1) and the second read bit line (RBL) is connected to a metal-oxide-metal (MOM) capacitor of a 255C0 capacitor structure to perform a multi-bit symbol calculation, wherein C0 represents a unit capacitor, a flexibly configurable switch is distributed between each group of 255C0s, the flexibly configurable switch is allowed for performing a capacitor recombination between different the first read bit line (RBL1) and the second read bit line (RBL 2) for a charge redistribution to achieve an operation between different bits, convolution results on the first read bit line (RBL 1) and the second read bit line (RBL 2) enter the 255C0 capacitor structure for the charge redistribution, and an activation result is obtained through an ReLU circuit to serve as a sampling input for a bypass of a bias voltage time converter (BVTC); and a D6T bitcell array in each row has one BVTC for collecting the convolution result and the activation result of the ReLU circuit, the activation result is sampled into at least one Csamp capacitor of the BVTC to keep or generate a time signal, and the time signal is input into the D6T bitcell array again for convolution.

2. The D6T IMC accelerator supporting always-linear discharge and reducing digital steps according to claim 1, wherein a symmetrical layout is adopted for the D6T bitcell, the first reading transistor (N2) and the second reading transistor (N3) are placed in upper left and lower left corners respectively, the data writing transistor N1 is placed in an upper right corner, the RBL 1, the RBL 2, and the WBL extend longitudinally, and the strobe signal lines S1 and S2 extend horizontally.

3. The D6T IMC accelerator supporting always-linear discharge and reducing digital steps according to claim 1, wherein the strobe signal lines S1 and S2 do not interfere with each other and are completely independent of each other, a first set of control logic is configured to read data from the RBL 1, and a second set of control logic is configured to read data from the RBL 2.

4. The D6T IMC accelerator supporting always-linear discharge and reducing digital steps according to claim 1, wherein in the IMC mode, multi-bit input data is encoded as time signals with different pulse widths, the time signals are input into the strobe signal lines S1 and S2, and a plurality of transistors on the RBL 1 and the RBL 2 perform discharge simultaneously to generate the convolution result.

5. The D6T IMC accelerator supporting always-linear discharge and reducing digital steps according to claim 1, wherein the first read bit line (RBL 1) and the second read bit line (RBL 2) of each column of D6T bitcells in the D6T array are allowed for simultaneously calculating two different images or two different parts of a same image.

6. The D6T IMC accelerator supporting always-linear discharge and reducing digital steps according to claim 1, wherein the ALDCM provides N-order linear convolution: the voltage of a BL is detected at time points T/N, 2T/N, 3T/N, ..., and (N−1)T/N, and if the voltage of the BL is less than VH−(VH−VL)/N, different voltage sources are configured to perform boosting for a plurality of times, wherein values of the different voltage sources may be selected independently to ensure the sufficient $V_{ds}$ for a plurality of boosted reading transistors the first reading transistor (N2) and the second reading transistor (N3).

7. The D6T IMC accelerator supporting always-linear discharge and reducing digital steps according to claim 1, wherein there are six Csamp capacitors in each BVTC, the six Csamp capacitors sample a voltage of a $C_{CR}$, and the $C_{CR}$ stores the convolution result just calculated.

8. The D6T IMC accelerator supporting always-linear discharge and reducing digital steps according to claim 1, wherein different Csamp capacitors output time signals with different pulse widths, and a larger voltage value stored in the Csamp capacitor of each BVTC leads to a larger pulse width of the generated time signal.

9. The D6T IMC accelerator supporting always-linear discharge and reducing digital steps according to claim 1, wherein a process of obtaining the time signal is as follows: the transistor P1, the transistor P2, and the data writing transistor N1 in the D6T bitcell achieve linear charging of a capacitor Cx, wherein the transistor P2 acts as the constant-current source, and the transistor P1 and the data writing transistor N1 serve as logic switches; and two input terminals of a high-precision high-speed comparator COMPA are connected to the capacitor Cx and the Csamp capacitor respectively, an output terminal of the high-precision high-speed comparator COMPA is connected to a first input terminal of a three-input NAND gate, and second and third input terminals of the three-input NAND gate are respectively configured to input an enabling signal EN and an output, wherein the output is of an inverter and related to turn-off of the high-precision high-speed comparator COMPA, wherein the enabling signal EN is synchronized with a charging start time of the capacitor Cx, wherein when the capacitor Cx begins constant-current charging, the enabling signal EN switches from "0" to "1", and in this case, the three-input NAND gate generate a falling edge of a time signal; when the high-precision high-speed comparator COMPA generates a conversion from "1" to "0", a rising edge of the time signal is generated; and the above two edges form a complete time signal with a pulse width, and at this time, the high-precision high-speed comparator COMPA is turned off to reduce a power consumption, while the inverter keeps outputting "0" to make a logical output of the three-input NAND gate always be "1" to obtain a time-domain signal with a sharp edge through an output terminal of the three-input NAND gate.

10. The D6T IMC accelerator supporting always-linear discharge and reducing digital steps according to claim 9, wherein four low-power comparators select a rough delay of 1 Td to 4 Td to enable the high-precision high-speed comparator COMPA.

* * * * *